US010512272B2

United States Patent
Mayernick

(10) Patent No.: US 10,512,272 B2
(45) Date of Patent: Dec. 24, 2019

(54) POCKET BUN PAN

(71) Applicant: Robert Mayernick, South Bend, IN (US)

(72) Inventor: Robert Mayernick, South Bend, IN (US)

(*) Notice: Subject to any disclaimer, the term of this patent is extended or adjusted under 35 U.S.C. 154(b) by 603 days.

(21) Appl. No.: 15/245,956

(22) Filed: Aug. 24, 2016

(65) Prior Publication Data

US 2016/0360759 A1  Dec. 15, 2016

Related U.S. Application Data

(60) Continuation-in-part of application No. 14/152,074, filed on Jan. 10, 2014, now abandoned, which is a division of application No. 13/553,868, filed on Jul. 20, 2012, now Pat. No. 8,870,151.

(51) Int. Cl.
  *A21B 3/13*  (2006.01)
  *A47J 37/01*  (2006.01)
  *A21D 8/06*  (2006.01)
  *A21D 13/32*  (2017.01)
  *A21D 13/40*  (2017.01)

(52) U.S. Cl.
  CPC .............. *A21B 3/133* (2013.01); *A21B 3/137* (2013.01); *A21D 8/06* (2013.01); *A21D 13/32* (2017.01); *A21D 13/40* (2017.01); *A47J 37/01* (2013.01); *A21B 3/139* (2013.01)

(58) Field of Classification Search
  CPC ......... A21B 3/133; A21B 3/137; A21B 3/139; A21D 13/32; A21D 8/06; A21D 13/40; A47J 37/01
  See application file for complete search history.

(56) References Cited

U.S. PATENT DOCUMENTS 1,727,257 A * 9/1929 Stratton ................. A21B 3/137
                                                              249/147

* cited by examiner

*Primary Examiner* — Katherine D LeBlanc
(74) *Attorney, Agent, or Firm* — Botkin & Hall, LLP

(57) ABSTRACT

A pan is provided that has a male mold portion, a housing that surrounds the male mold portion, and a top portion with a wing plate that has a complimentary outer surface to the end surface of the male mold portion. The complimentary outer surface forms a more consistent thickness of a baked item. The housing has a bottom surface with an aperture in the bottom to receive the male mold portion. The bottom surface acts to eject the baked item from the pan as the male mold portion is removed from the pan. The top portion can be formed with a continuous surface or have a wing plate that is spaced from a planar portion.

6 Claims, 14 Drawing Sheets

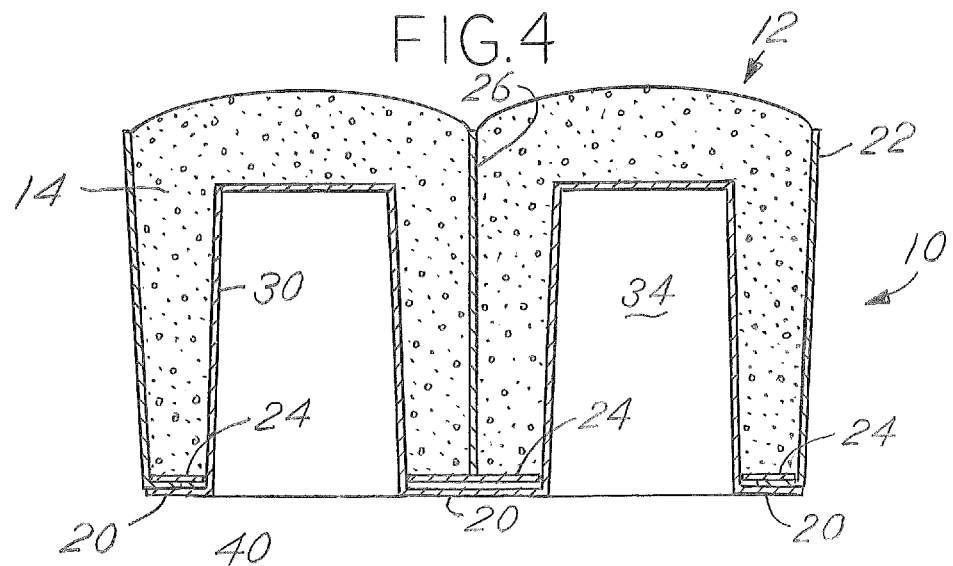
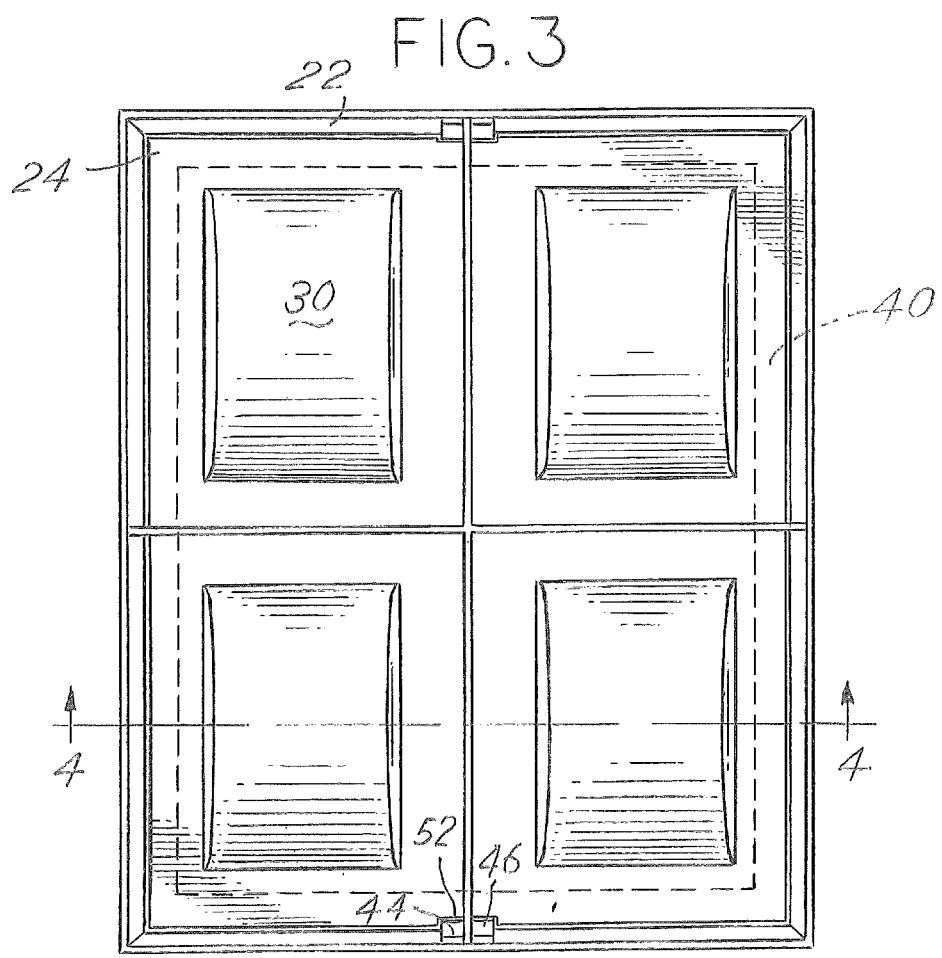

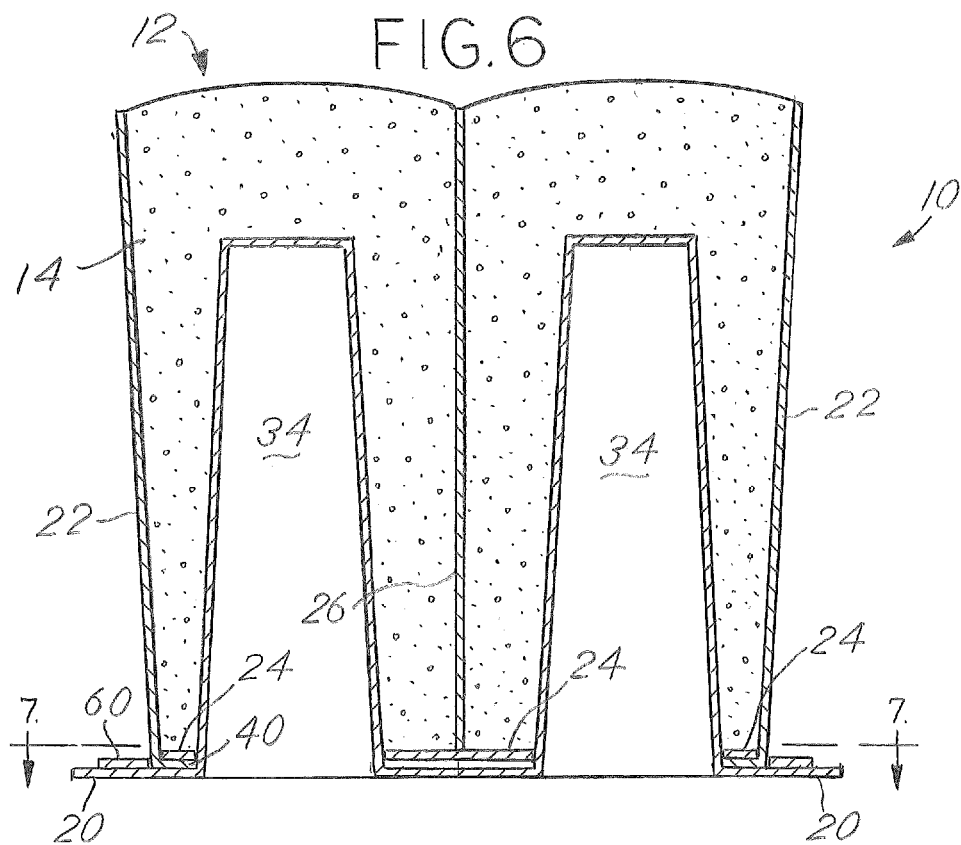
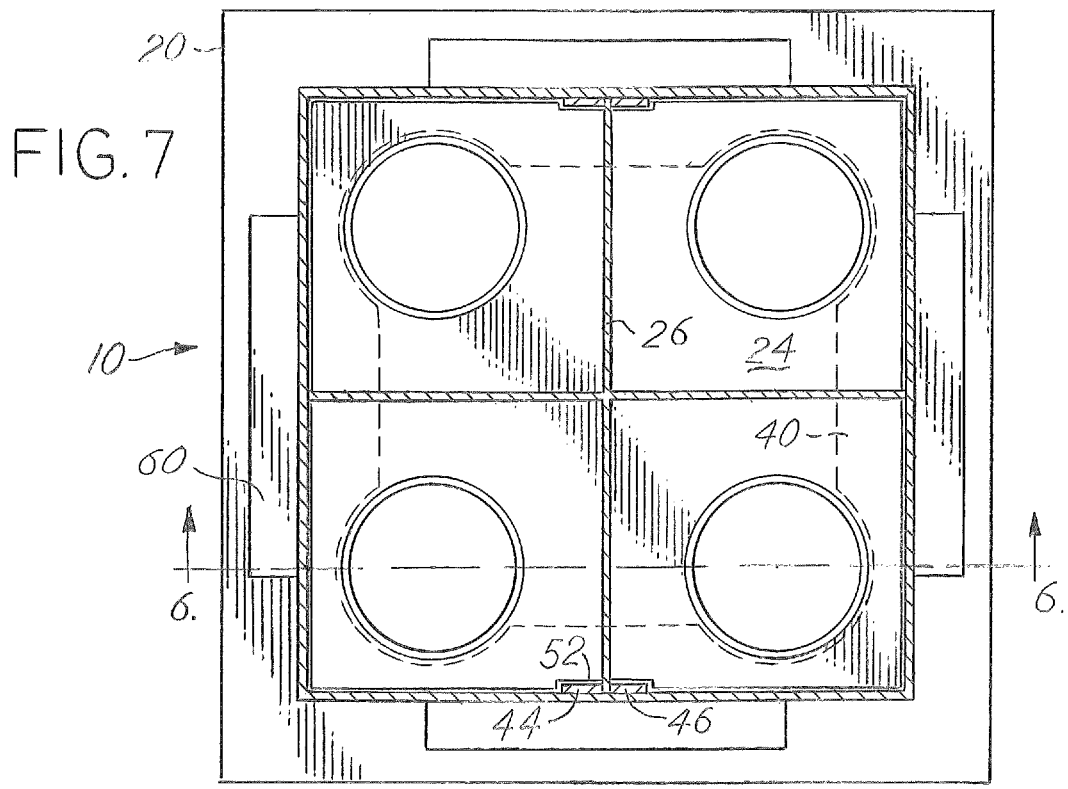

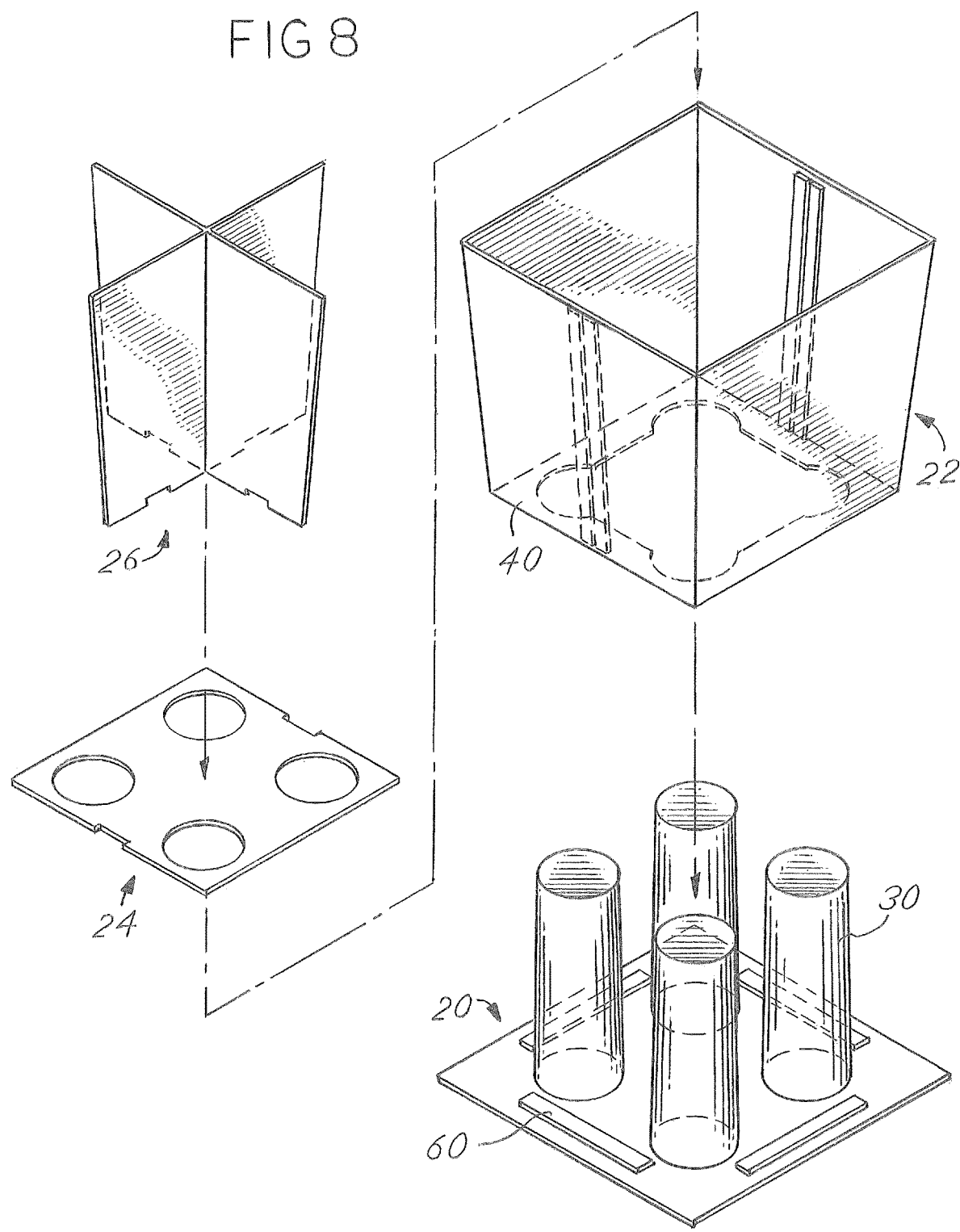

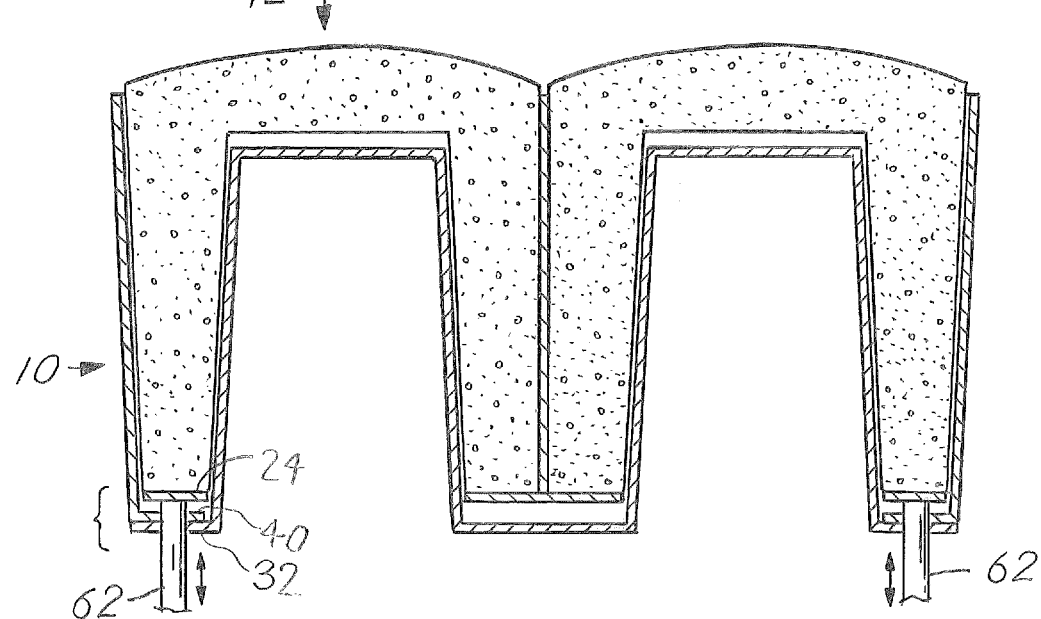
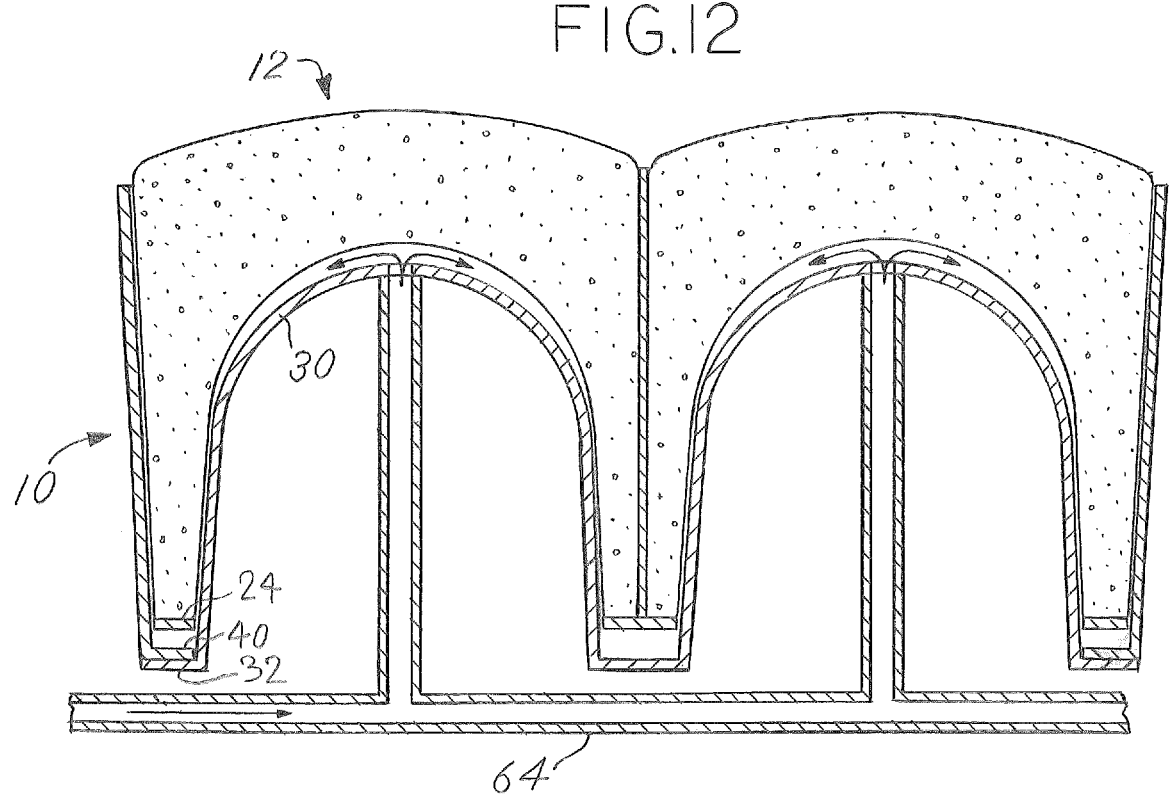

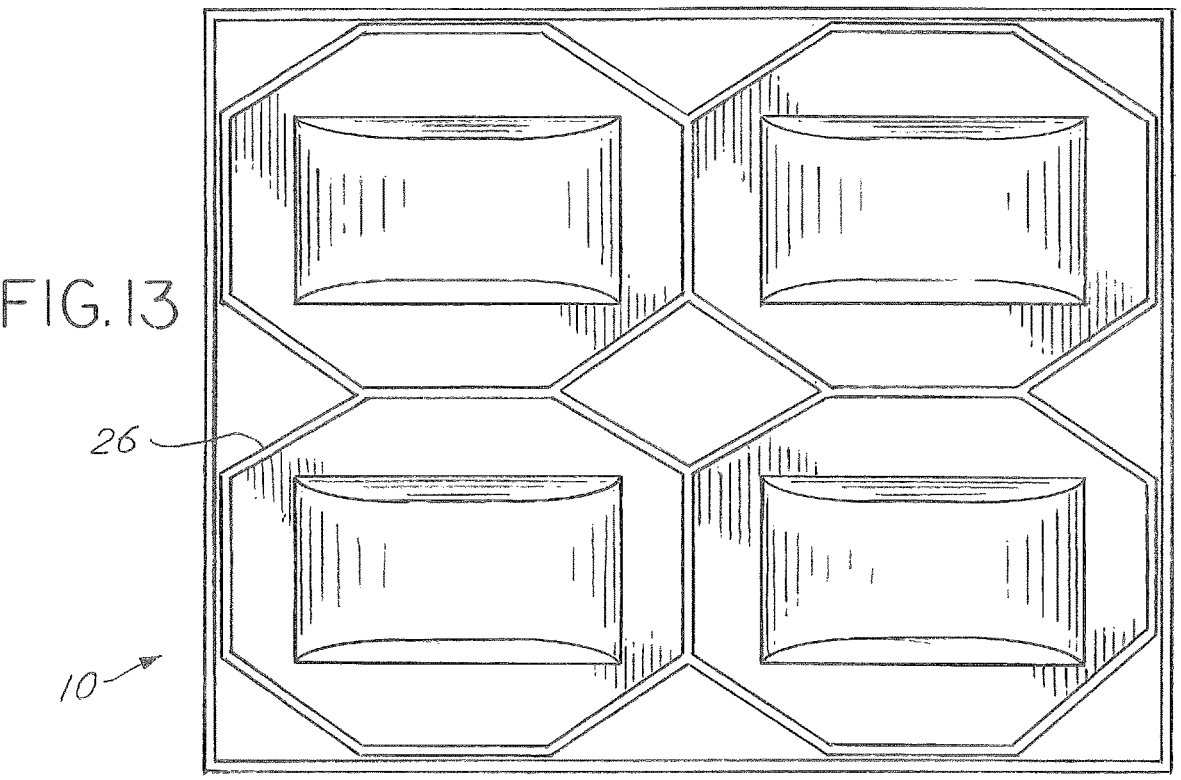
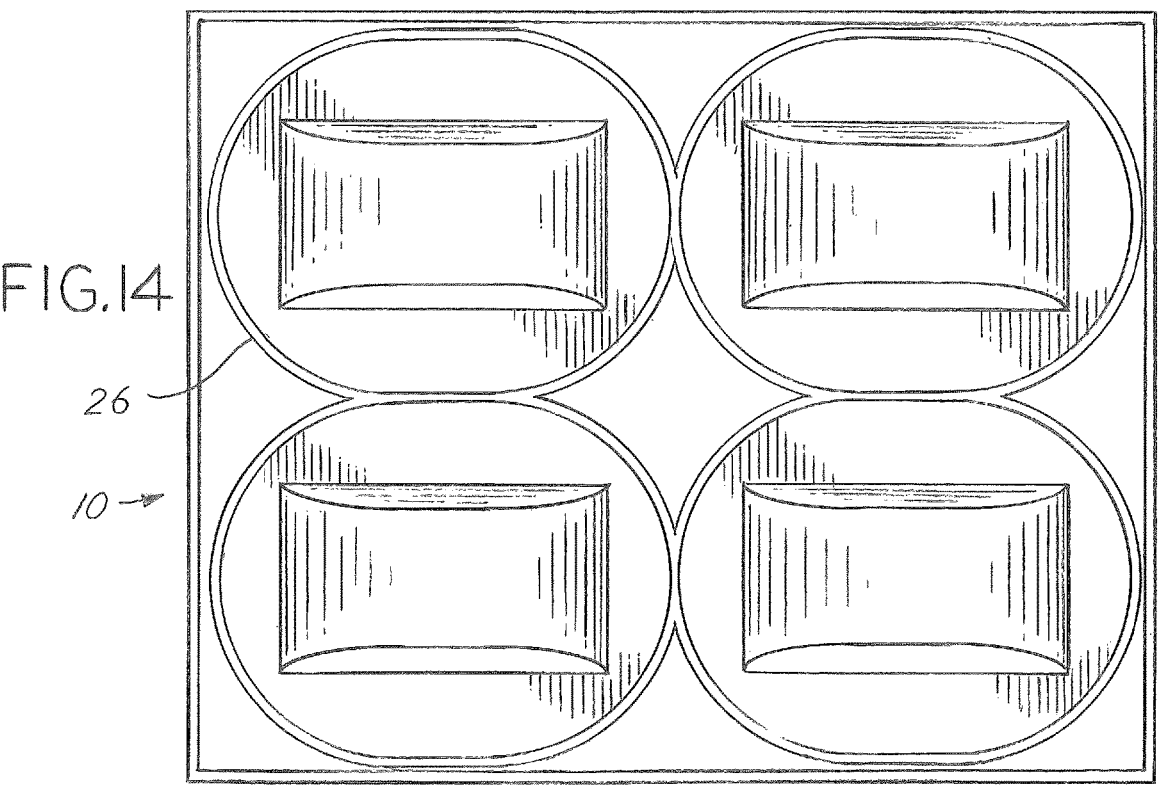

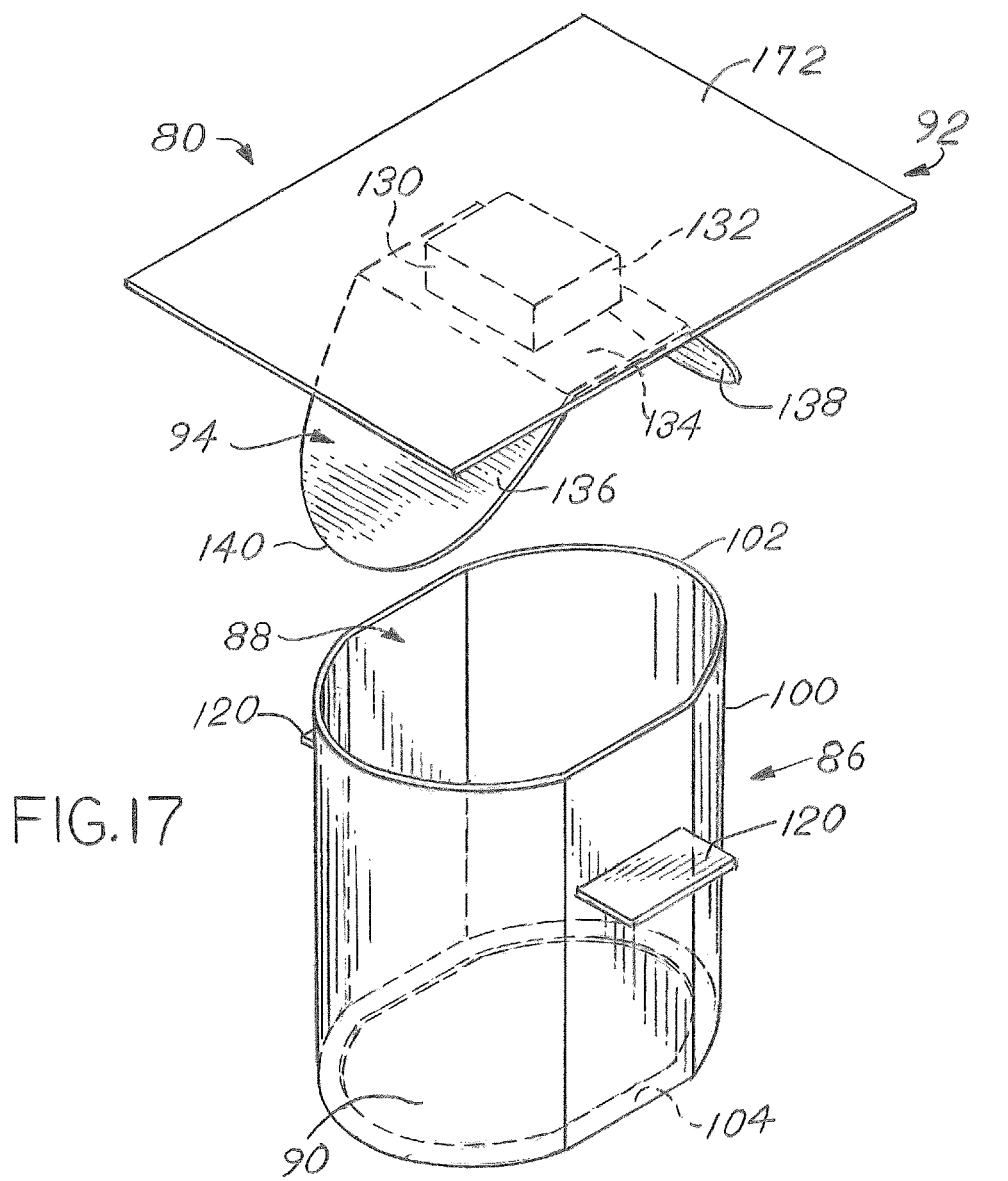
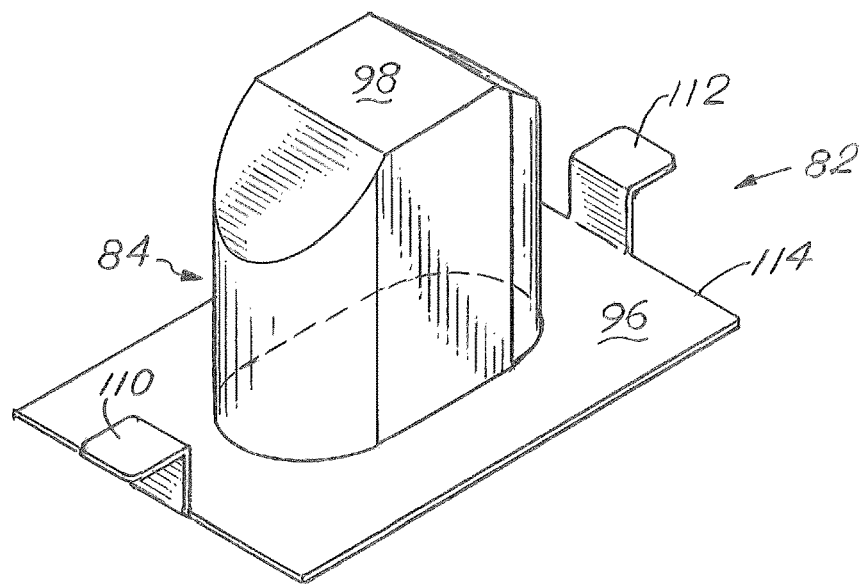
FIG.17

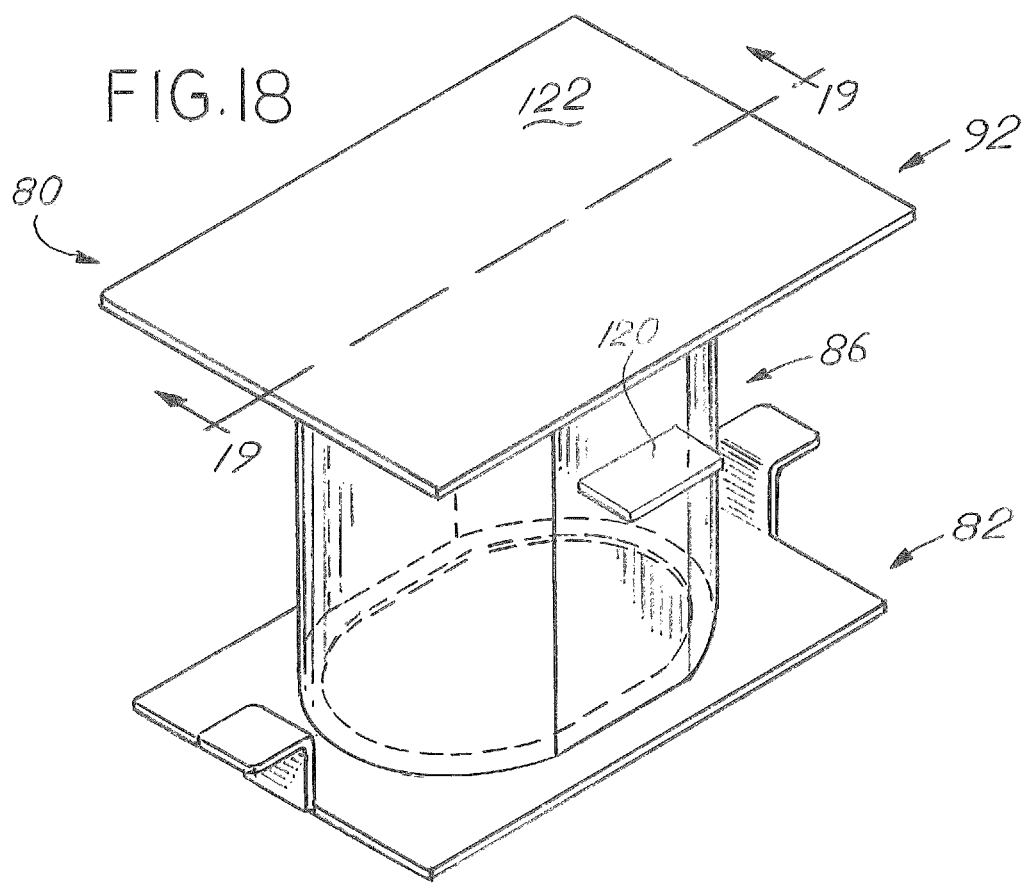
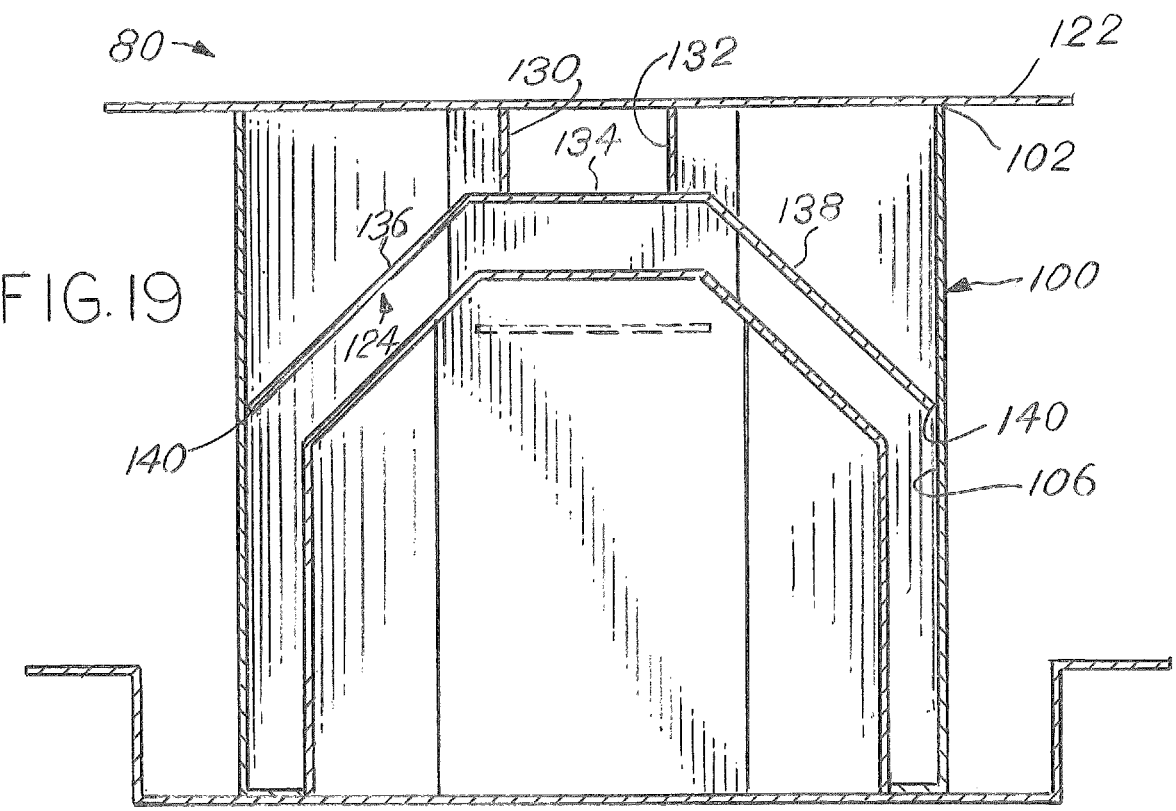

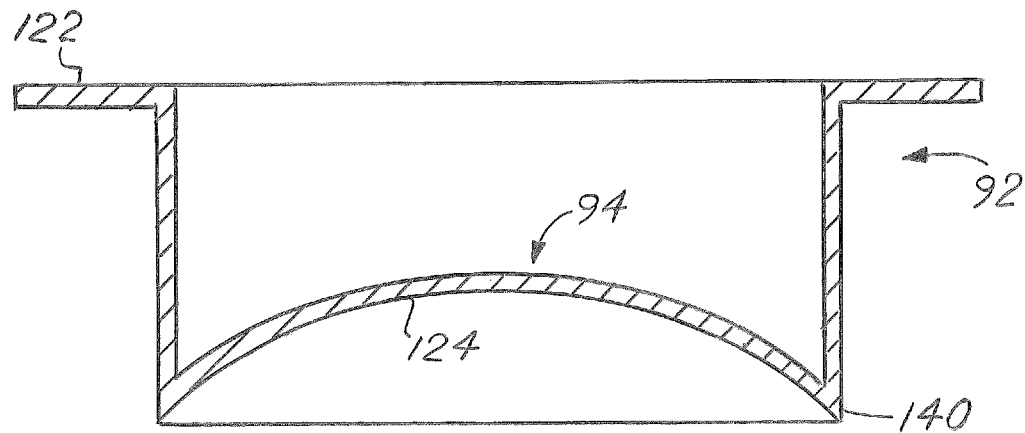
FIG. 21
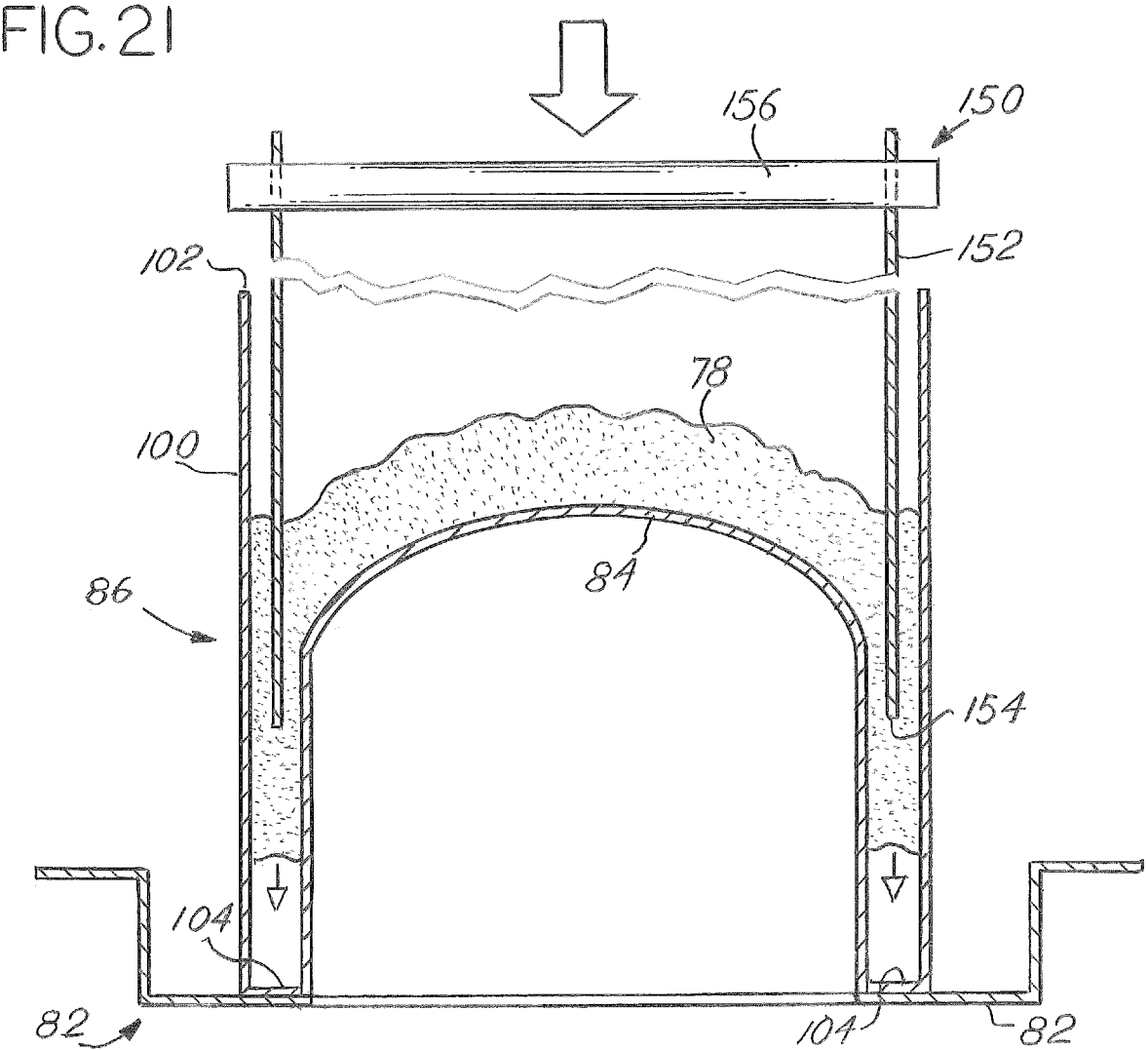

POCKET BUN PAN

CROSS REFERENCE TO RELATED APPLICATIONS

This application is a Continuation-in-Part of U.S. application Ser. No. 14/152,074 filed Jan. 10, 2014, which is a divisional of U.S. application Ser. No. 13/553,868 filed Jul. 20, 2012, the disclosure of which is hereby incorporated by reference.

BACKGROUND OF THE INVENTION

A typical sandwich is formed having a filling disposed between two pieces of bread. A hamburger is one common sandwich, with a ground beef patty, vegetables and condiments disposed between an upper and lower bun. Sometimes the bread is hinged, such as is used with a hotdog or sausage. The common failing of these types of sandwiches is that they can be difficult to eat tidily when on the go—the sandwich filling can leak out of the bread while being eaten. As such an improved bun is needed for containing sandwich filling. The disclosure provided herein describes an improved pan for baking a bun suitable for use in making a variety of sandwiches (including, but not limited to, hotdogs, sausages, hamburgers, sub sandwiches, loose meat sandwiches, among many others).

SUMMARY OF THE INVENTION

The present disclosure describes a pan for preparing an improved bun suitable for making various types of sandwiches. The pan described herein is composed of a base plate, a housing, an ejector plate, and a divider. The pan, when assembled, is shaped to form a pocket bun therein. The pan is designed to be disassembled in a way to allow ready ejection of the pocket bun from the pan.

The pan may include a single chamber for producing a single bun, or multiple chambers for producing multiple buns from a single pan. One chamber may include a single male mold for producing a bun having a single cavity, or multiple male molds for producing a bun having multiple cavities. The divider separates the chambers and may include openings to allow buns in adjacent chambers to form a baked connector therebetween for holding the buns together during packaging.

The pan of the present disclosure includes further improvements over previous pans, including providing a pan with means for ejecting deep-draw goods from the pan such as through a pneumatic system or use of ejection pins. In one configuration, the pan of the present disclosure produces a bun having a plurality of cavities, such that food stuffs are independently insertable into each cavity. In an additional configuration, the shape of either the exterior of the bun or the cavity of the bun is formed with a distinctive shape so as to provide unique brand-identifying capabilities. An optional top with a wing plate can help to form a portion of the outside to cause the bun to have a more defined outer shape and a controlled wall thickness.

BRIEF DESCRIPTION OF THE DRAWINGS

A preferred embodiment of this invention has been chosen wherein:

FIG. 3 is a top view of the pan of FIG. 1;

FIG. 4 is a sectional side view of the pan of FIG. 3 as taken along line 4-4 and shown housing two buns;

FIG. 6 is a sectional side view of the pan of FIG. 7 as taken along line 6-6 shown housing two buns;

FIG. 7 is a top view of the pan of FIG. 5;

FIG. 8 is an exploded view of the pan of FIG. 5;

FIG. 11 is a sectional side view of the pan of FIG. 1 and showing the ejector pins;

FIG. 12 is a sectional side view of the pan of FIG. 10, and showing an alternative ejector system;

FIG. 13 is a top view of a pan showing a divider providing an octagon-shaped outer cross-section to the buns;

FIG. 14 is a top view of a pan showing a divider providing an oval-shaped outer cross-section to the buns;

FIG. 17 is an exploded perspective view of the three piece pan;

FIG. 18 is an perspective view of the pan in FIG. 17 as assembled;

FIG. 19 is a section view 19-19 of the pan in FIG. 18;

FIG. 21 is a section view 21-21 of the pan in FIG. 20.

DESCRIPTION OF THE PREFERRED EMBODIMENT

Figure 15:
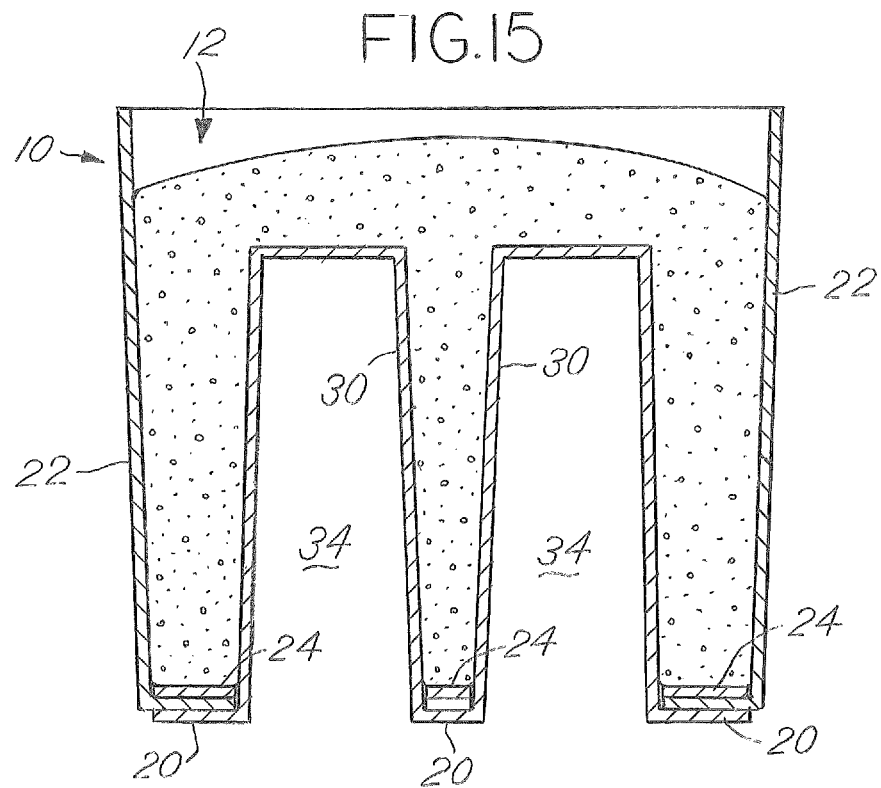
FIG. 15 is a sectional side view of a pan for forming a single bun having two cavities.
Figure 16:
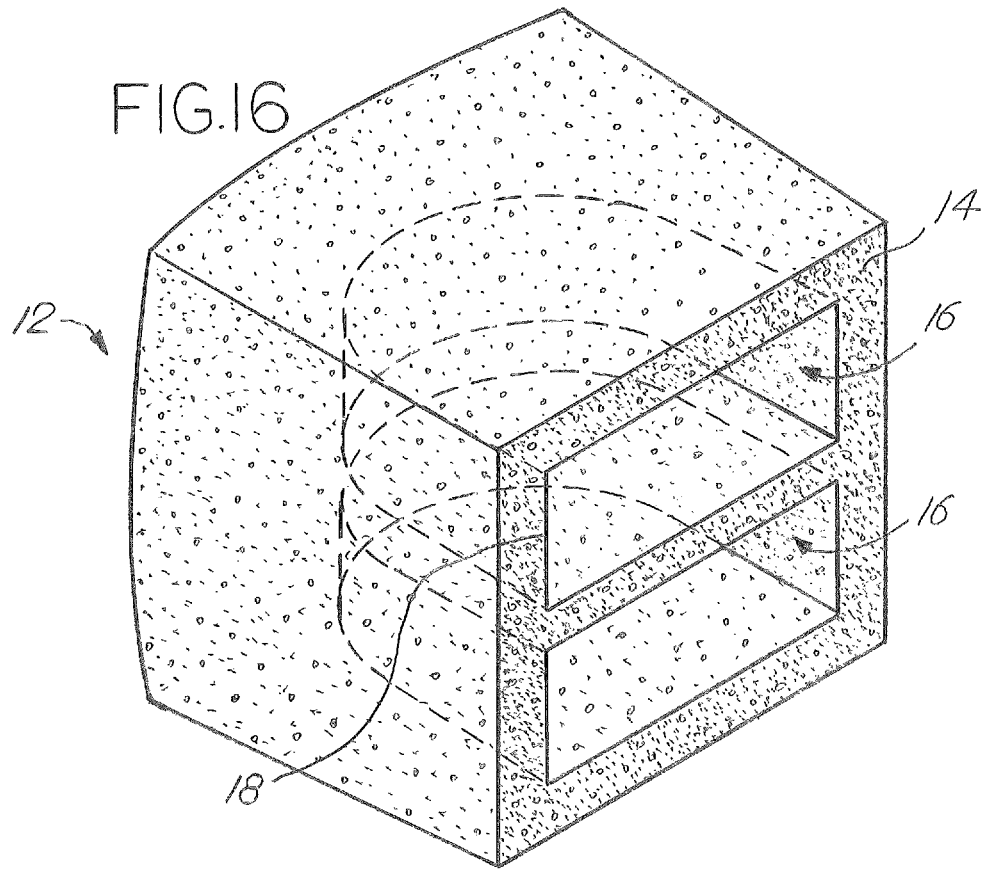
FIG. 16 is a perspective view of a bun formed from the pan of FIG. 15.

The present disclosure describes a pan 10 suitable for preparing a pocket bun 12. Pocket bun 12 is a molded object one embodiment of which is shown in FIG. 16, such as a food product or bun, formed having a wall 14 which defines a cavity 16 (other embodiments of bun 12 are shown in side-view in FIGS. 4, 6, 11, 12, and 15, where FIG. 16 shows a two-cavity bun, and the remaining figures show single-cavity buns). An opening 18 is formed through wall 14 and allows access to cavity 16. Cavity 16 and opening 18 together form an open mouth in pocket bun 12, with cavity 16 suitable for carrying food products, such as a hamburger, a hotdog, cold cuts, or any other food products and related condiments and dressings. The present disclosure is directed to pan 10, any references to pocket bun 12 should not be seen as limiting the uses of pan 10. It is understood that bun 12 formed in pan 10 is suitable for carrying a variety of sandwich fillings, and any reference to a specific type of filling is merely illustrative and does not limit the use of the bun. For example, any reference to hotdogs is only to illustrate the general shape of the bun, not to limit the bun from being used with other types of fillings.

As described herein, pan 10, and associated parts described in detail below, are referred to as having upper and lower ends. These designations are for ease of reference herein, with the upper end referring generally to the open top of pan 10, and the lower end referring generally to the base of pan 10 opposite the open top. It is understood that as used, pan 10 is positionable in any number of orientations, and as such any reference to upper and lower is not seen as limiting.

Figure 1:
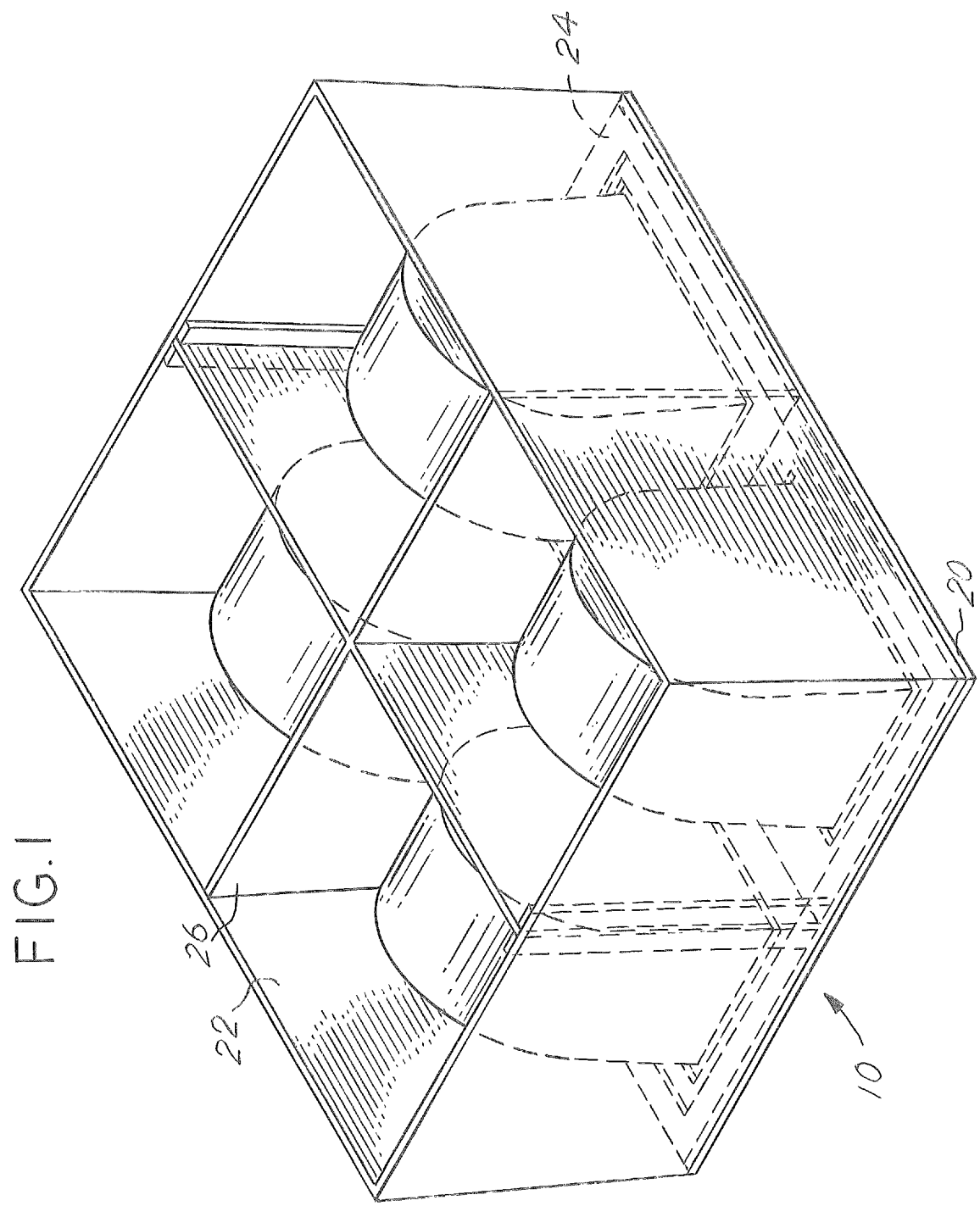
FIG. 1 is a perspective view of a pan suitable for forming one or more hamburger-accommodating pocket buns.
Figure 2:
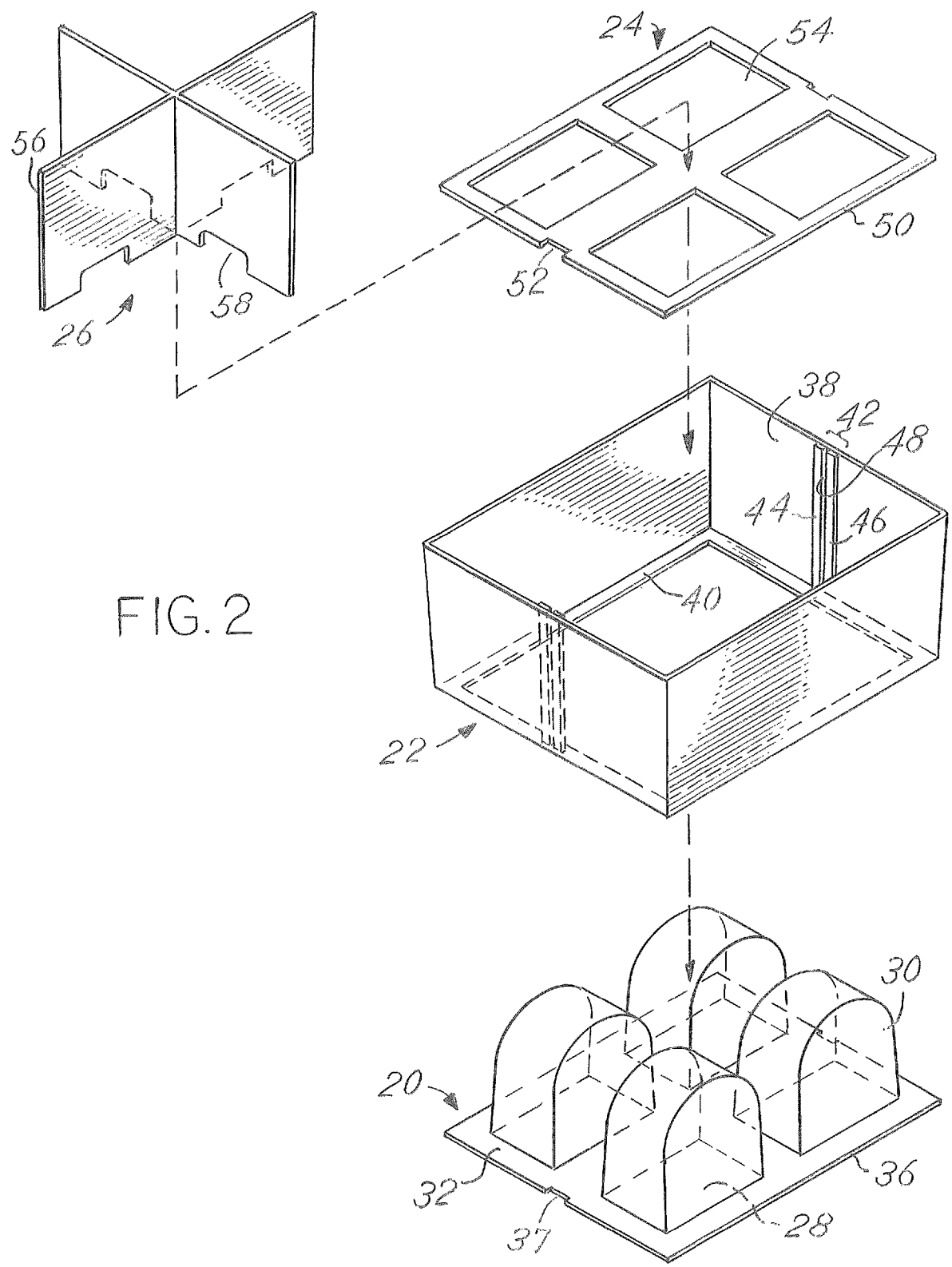
FIG. 2 is an exploded view of the pan of FIG. 1.

Pan 10 is formed from a group of nestable parts: a base plate 20, a housing 22, an ejection plate 24 and a divider 26, as shown assembled in FIG. 1 and in exploded view in FIG. 2. Base plate 20 is a generally flat plate having an aperture 28 passing therethrough and spaced inwardly from an outer edge 36. A male mold 30 extends from a top side 32 of base plate 20. Male mold 30 circumscribes aperture 28, such that male mold 30 has a cavity 34 with an opening defined by aperture 28 (cavity 34 shown in FIG. 4). The male mold 30, once used to bake the bun 12, creates cavities 16 in the bun as shown in FIG. 16. Male mold 30 is preferably tapered such that a cross-section of male mold 30 taken parallel to and proximate base plate 20 is larger than a cross-section of male mold 30 taken near the upper end. Male mold 30 is tapered to aid in ejecting bun 12 from pan 10. As shown in FIGS. 1-3, male mold 30 has a generally rectangular cross-section, though other cross-sections are suitable, see, for example, FIGS. 5-8 (round cross-section), FIG. 9 (octagon cross-section), and FIG. 10 (oval cross-section). Base plate 20 may include a single aperture 28/mold 30 combination, such as for preparing a single pocket bun 12, or alternatively may include an array of aperture 28/mold 30 combinations (as shown in FIG. 2), such as for preparing multiple pocket buns 12 using a single pan 10, or for preparing a single bun 12 having multiple cavities 16 (as shown in FIG. 15).

Housing 22, as shown in FIG. 2, is formed having an upright wall 38 defining an interior space, with a lip 40 extending inwardly from and inscribing the lower end of upright wall 38. When pan 10 is assembled, lip 40 overlies base plate 20. As shown in FIGS. 3 and 4, upright wall 38 is tapered such that the upper end is wider than the lower end, to ease removal of pocket bun 12 from pan 10. A guide 42 is positioned on the interior face of upright wall 38, with the guide formed from a first rail 44 and a second rail 46. First rail 44 is positioned generally vertically, and second rail 46 is offset from, and generally parallel to first rail 44. Rails 44, 46 are offset from one another such that a gap 48 is formed therebetween. The embodiment of housing 22 shown in FIG. 2 includes a pair of guides 42 positioned on facing surfaces of upright wall 38. In other embodiments, the number and positioning of guides 42 is variable depending on the number and positions of the aperture 28/mold 30 pairs of base plate 20. In additional embodiments, guides 42 are omitted from housing 22. It is contemplated that base 20 includes notches 37, such that base 20 is alternatively positionable sandwiched between housing 22 and ejector plate 24 with notches 37 locating base 20 relative housing 22.

Ejection plate 24 is defined as a generally flat plate having an outer edge 50. With pan 10 assembled, ejection plate 24 overlies lip 40 of housing 22. A notch 52 forms an indentation in edge 50, with notch 52 sized to straddle guide 42 when pan 10 is assembled, thereby notch 52 locates ejection plate 24 relative housing 22, as shown in FIG. 3. Ejection plate 24 includes an aperture 54 formed therethrough, aperture 54 is sized at least as large as the largest cross-section of mold 30, such that aperture 54 encircles mold 30 when pan 10 is assembled.

Divider 26 is defined as an upright plate overlying ejection plate 24 and subdividing the interior of housing 22 into multiple chambers. In the embodiments shown in FIGS. 2 and 8 divider 26 is X-shaped, with four plates joined together at the intersection formed therebetween. With pan 10 assembled, an outer edge 56 of divider 26 is located at gap 48 between first rail 44 and second rail 46 of guide 42, such that guide 42 retains divider 26 at a specified position within housing 26. Divider 26 includes a gap 58 formed at the bottom edge of divider 26. FIGS. 3 and 7 show a top view of pan 10 as assembled, where divider 26 is used to subdivide the pan into four quadrants, with each quadrant forming a chamber suitable for baking a pocket bun 12. Gap 58 provides an opening between adjacent chambers to allow adjacent pocket buns 12 to be joined together, such as to aid in keeping groups of pocket buns 12 together during processing or shipping. Gap 58 may be positioned at any of many suitable positions on divider 26, such as at the outer corners of divider 26 or at the intersection between the plates, or spaced between the corners and intersection as is shown in FIG. 2. It is contemplated that gap 58 may be omitted, thereby providing a pan 10 which completely segregates buns 12.

It is contemplated, such as is shown in FIGS. 13 and 14, that divider 26 is shaped other than as an X to form buns of different shapes. It is also contemplated that divider 26 may be omitted and the resulting buns may be sliced into individual buns in a separate step. It is contemplated that gap 58 is omitted such that divider 26 forms a complete partition between adjoining chambers.

FIG. 3 is a top view of pan 10 showing ejection plate 24 overlying lip 40 of housing 22 (lip 40 shown in dotted line). Notch 52 of ejection plate 24 locating ejection plate 24 in house 22 relative guide rails 44, 46. Male molds 30 are shown extending up through ejection plate 24. It is contemplated that ejection plate 24 may be omitted.

FIG. 4 shows a side view of pan 10. Pocket bun 12 is shown in pan 10. FIG. 4 shows how the constituent parts of pan 10 stack together, with divider 26 overlying ejection plate 24, ejection plate 24 overlying lip 40 of housing 22, and lip 40 overlying base 20. Male mold 30 extends upwardly through ejection plate 24 into housing 22.

Figure 5:
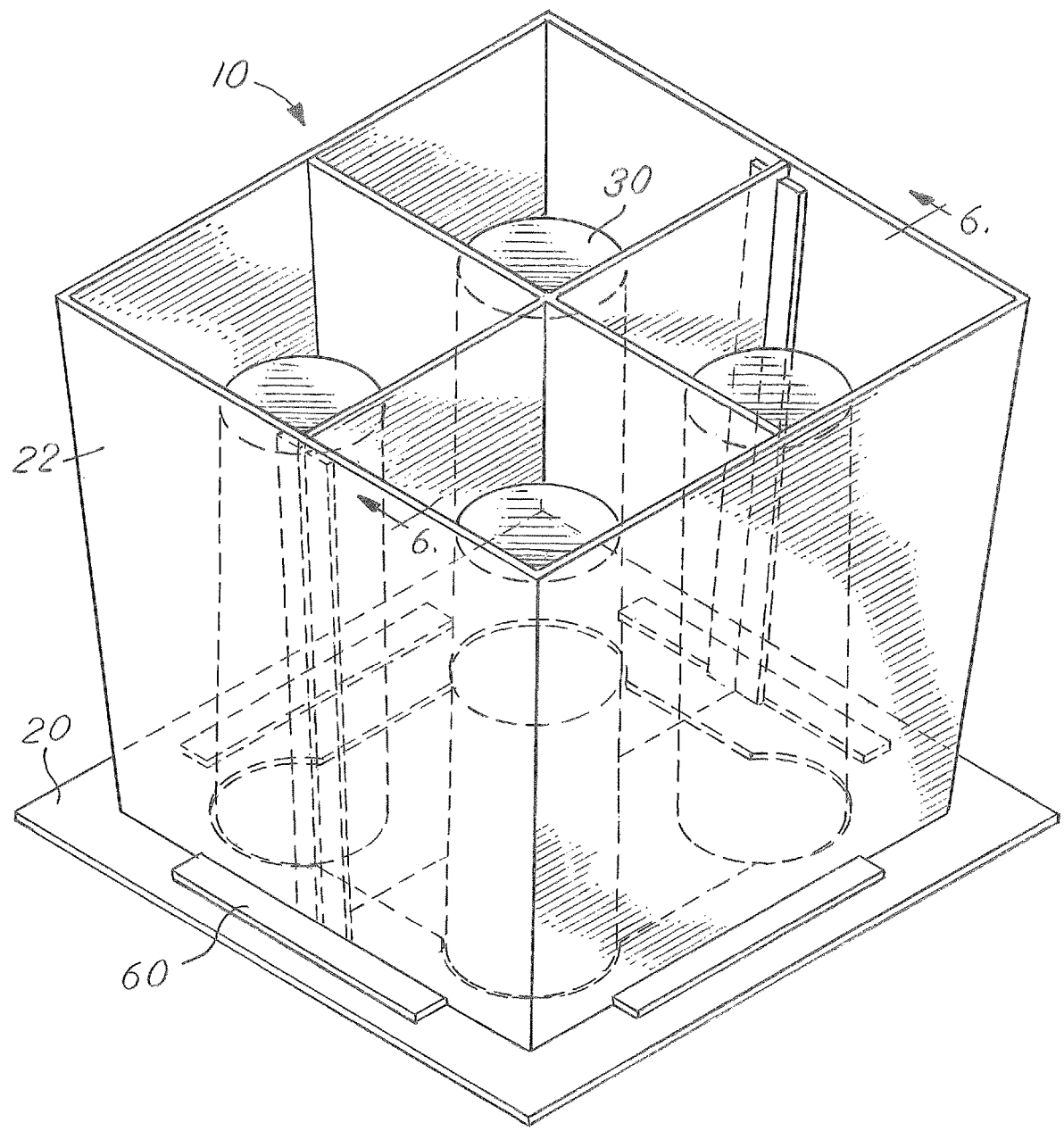
FIG. 5 is a perspective view of a pan suitable for forming one or more hotdog-accommodating pocket buns.

Referring now to FIGS. 5-8, in one embodiment pan 10 is shaped to form a bun 12 suitable for carrying a hotdog and associated condiments. As will be appreciated by comparing FIG. 1 and FIG. 5, each embodiment includes the same constituent parts: base 20, housing 22, ejection plate 24 and divider 26, the main difference being the relative dimensions and shape of the parts. For example, housing 22 of FIG. 5 is generally taller than that of FIG. 1 to allow for the forming of a long bun shaped to carry a hotdog. Similarly, male mold 30 of FIG. 5 has a circular cross-section to accommodate a hotdog.

FIG. 8 shows an exploded view of the constituent parts of the pan 10 of FIG. 5. FIG. 8 shows housing 22 and lip 40, with lip 40 contoured to match the shape of male molds 30. Base 20 includes spacers 60 which serve to locate housing 22 on base 20. Spacers 60 are raised bosses or strips extending from the surface of base 20 which contact the outer wall of housing 22 when pan 10 is assembled. FIG. 1 shows an embodiment of pan 10 which omits spacers 60. It is envisioned that pan 10 of FIG. 1 could be modified to include a spacer 60 by enlarging the dimensions of base 20. Likewise, it is envisioned that pan 10 of FIG. 8 could be modified to omit spacer 60.

FIG. 6 shows a cross-sectional side view of the embodiment of pan 10 showing how the constituent parts overly one another in assembled form. FIG. 6 is comparable to FIG. 4. Similarly, FIG. 7 is comparable to FIG. 3 in showing a top view of the respective embodiments of pan 10.

Figure 9:
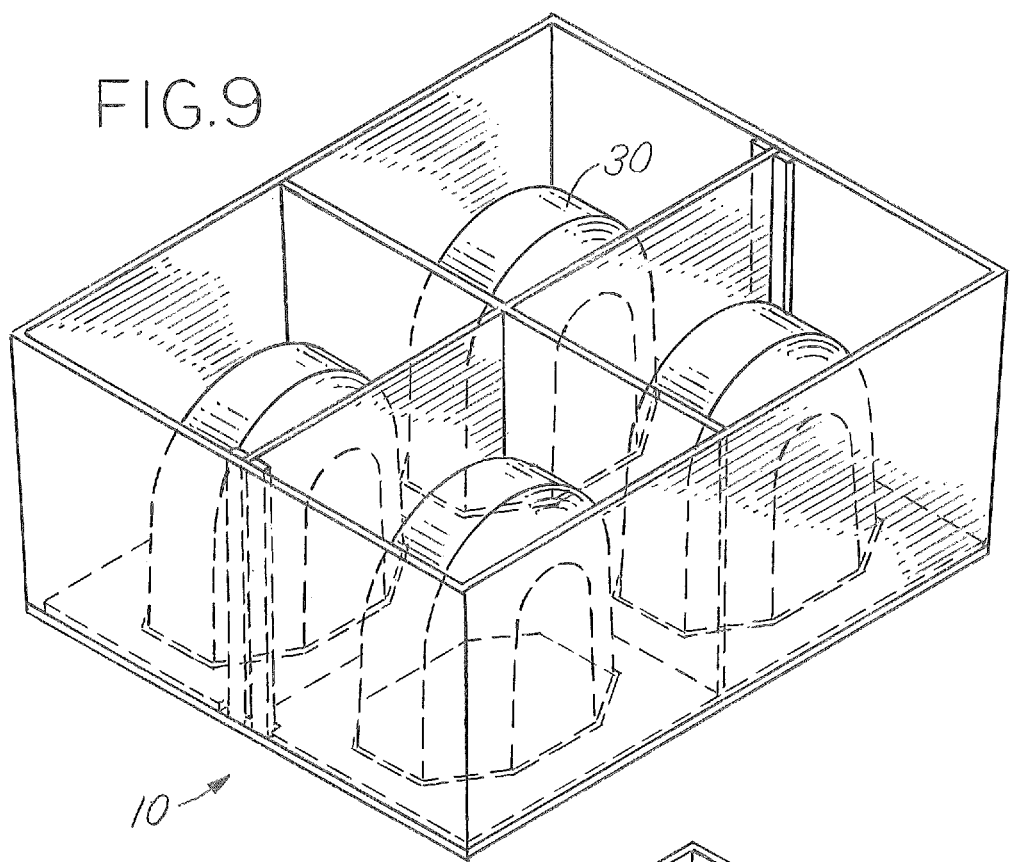
FIG. 9 is a perspective view of a pan showing the male mold having an octagon-shaped cross-section.
Figure 10:
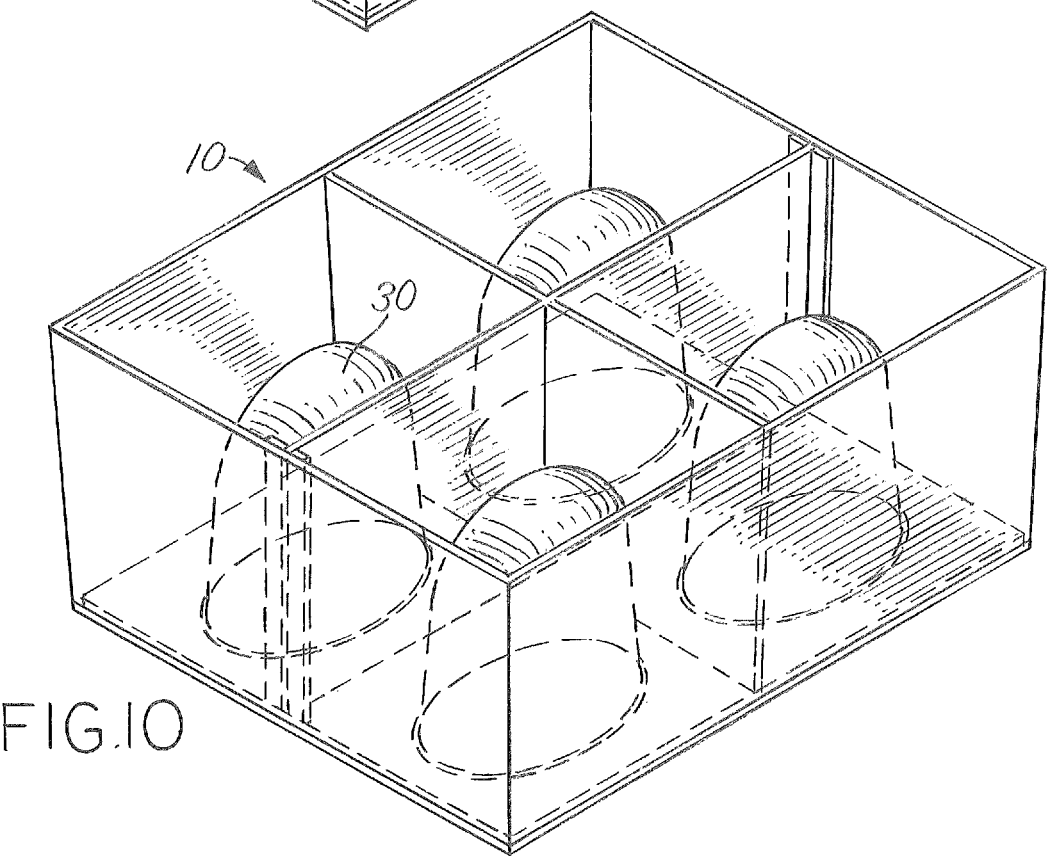
FIG. 10 is a perspective view of a pan showing the male mold having an oval-shaped cross-section.

FIGS. 9 and 10 show alternative shapes of male mold 30. FIG. 9 shows male mold 30 having an octagon-shaped cross-section. FIG. 10 shows male mold 30 having an oval-shaped cross-section. As is clear from FIGS. 9 and 10, male mold 30 is formable in any one of many possible cross-sectional shapes, which in turn forms the internal cavity of pocket bun 12 in the corresponding shape. As such, the shape of male mold 30 can be customized to allow for a specific type of food, or to allow for distinctive marketing or branding. The shape of male mold 30 may be customized on either the hamburger or hotdog accommodating bun pans. The cross-sections shown herein are merely illustrative, and should not be viewed as limiting. Such cross-sections are preferably polygon shaped. Such cross-sections are more preferably equi-angular polygons such as: triangle, square, pentagon, hexagon, heptagon, or octagon. Other shapes which provide brand-identification are suitable.

FIG. 11 shows a sectional side view of pan 10, showing an auto-ejection system having ejection pins 62. Ejection pins 62 pass through apertures in base 20 such that when actuated, ejection pins 62 apply a force to ejection plate 24, to force bun 12 away from pan 10. Ejection pins 62 may be mechanically, pneumatically, electrically, manually, or otherwise actuated. Alternatively, ejection plate 24 is omitted and ejection pins 62 force housing 22 away from base 20, and housing 22 urges bun 12 out of pan 10. It is contemplated that base plate 20 is carried above lip 40 of housing 22, such that pin 62, when actuated, forced base 20 up and away from housing 22. Additionally, it is contemplated that pin 62, when actuated, contacts bun 12 directly, causing bun 12 to come free from pan 10.

FIG. 12 shows a sectional side view of pan 10 having an air manifold 64 for providing a pneumatic release system to pan 10, whereby air is used to force bun 12 free from pan 10. Manifold 64 is in fluid communication with apertures in male mold 30, such that when activated, air forces bun 12 away from pan 10. It is contemplated that ejector plate 24 may be omitted where manifold 64 is used to eject bun 12 from pan 10.

FIGS. 13 and 14 show alternative shapes of divider 26, such as to form a pocket bun 12 having an octagon-shaped outer cross-section (as in FIG. 13), or a pocket bun 12 having an oval-shaped outer cross-section (as in FIG. 14). The shape of divider 26 may be selected to yield the outer cross-section desired for a given pocket bun 12. The outer cross-section and cavity cross-section of pocket bun 12 may each be independently selected to yield a pocket bun 12 having desired characteristics, such as for brand identification or similar distinctive aesthetic enhancement of bun 12. The cross-sections shown herein are merely illustrative, and should not be viewed as limiting. Such cross-sections are preferably polygon shaped. Such cross-sections are more preferably equi-angular polygons such as: triangle, square, pentagon, hexagon, heptagon, or octagon. Other shapes which provide brand-identification are suitable.

In one embodiment as shown in FIG. 16, a bun is formed having a pair of inner chambers. This embodiment is useful for building a three-layer sandwich, such as bun-filling-bun-filling-bun, as is common at some fast food restaurants. An example of this embodiment is shown in FIGS. 15 and 16. Here, pan 10 includes a pair of male molds 30 without a divider between them such that a bun 12 is formed having a pair of cavities. The dimensions shown in FIG. 16 are merely illustrative, the dimensions of bun 12 (such as the thickness of wall 14 or the relative size of cavity 16) may be varied according to the type of bun which is desired. The same can be said for a bun formed having a single cavity.

One advantage of bun 12 formed by pan 10 over prior art breads is that pan 10 forms a bun where both the outer surface and the cavity surface of bun 12 has a browned surface. Most buns, for example a common hamburger bun, have a browned outer surface, but the inner surface is not browned, but is formed by splitting the bread open. The present bun 12 includes an inner cavity having a browned surface such that when a filling is placed in the bun the filling contacts a browned surface and the browned surface serves to minimize the bread becoming soggy by resisting absorption of moisture from the filling. In this way, pan 10 bakes a bun 12 which resists becoming soggy.

The outer surface of bun 12 is browned either by direct contact from heated air when baking (such as is the case at the open top of pan 10), or by conductive heat transferred from pan 10 to the bun. Base plate 20 includes apertures 28 through which heated air enters the internal cavity of male mold 30, such that male mold 30 is heated during baking so as to brown the inner cavity 16 of bun 12. Browning the inner cavity 16 of bun 12 provides the beneficial effect of forming a filling-accepting portion of bun 12 which is resistant to becoming soggy.

Pan 10 is formed from a material sufficient at least to withstand the heat of baking, to retain shape when baking, and to transfer heat to brown bun 12 when baking. Such materials include, but are not limited to, aluminum, steel and other metals, silicone, tempered glass, ceramic, or composite. Any of such materials may include a non-stick coating. Pan 10 is formed having an open top wherein the open top allow gases to escape from the pan when bun is being baked.

An embodiment of the pan 80 is shown in FIGS. 17-21. In this embodiment, the dough 78, as seen in FIG. 21, is formed and baked over a base plate 82 with a male mold portion 84. As shown in FIG. 17, the pan 80 includes a housing 86 that has an open top 88 and an aperture 90 for receiving the male mold portion 84. The pan 80 further includes a top cap 92. The top cap 92 has a wing plate 94 that extends into the housing 86. The base plate 82, housing 86, and top cap 92 enclose the pan 80 to constrain the dough as it is being baked. The assembled pan 80 and enclosed volume are shown in the section view FIG. 19. It is contemplated that the top cap 92 is used to initially form the dough and then the top cap 92 is removed during the baking process.

The base plate 82 has the male mold portion 84 that extends from a planar portion 96. The male mold portion 84 and planar portion 96 form a continuous surface, shown in FIGS. 17 and 20. The outer surface of the male mold portion 84 is designed to be in direct contact with dough 78 and baked bread, as the outside shape is designed to form the inside pocket of a bun as it is baked. The male mold portion 84 is shown as tapered, also known as draft, which assists the male mold portion 84 to release the dough once it is baked into a bun. At the end of the male mold portion 84 is a terminal end surface 98. The terminal end surface 98 is spaced from the planar portion 96 by a first distance. The terminal end surface 98 can have different shapes, based on the style of bun and anticipated ingredients for the bun. As previously described, the male mold portion 84 is smallest at the terminal end surface 98. While the embodiment shown is tapered, it is anticipated that the male mold portion 84 is straight. The base plate 82, particularly the planar portion 96, shows optional ejection tabs 110, 112. Each ejection tab 110, 112 extends outwardly from the perimeter edge 114 of the planar portion 96. The ejection tabs 110, 112 are used by automation equipment to grasp the base plate 82 and remove it from the housing 86. The ejection tabs 110, 112 are shown as extending outwardly, but other features are anticipated to assist automation equipment.

The housing 86 has a continuous upstanding wall 100 with a top edge 102 and a bottom wall 104 with the aperture 90. The bottom wall 104 acts as an ejection feature to remove the bun as the housing 86 and male mold portion 84 are separated. The top edge 102 is shown as a smooth continuous edge. The bottom wall 104 is continuously attached where it intersects the upstanding wall 100. As previously described, the bottom wall 104 has an aperture 90 that is sized to receive the male mold portion 84. The size and shape of the aperture 90 closely match the male mold portion 84 when the base plate 82 is mated with the housing 86. Matching the sizes closely between the aperture 90 and the male mold portion 84 allow dough to be inserted into the mold without dangers of leakage as the dough is baked. The upstanding wall has an inside surface 106 and an outside surface 108. The housing 86 further includes ejection tabs 120. The ejection tabs 120 allow automation equipment to grasp the housing 86 to allow baked bread to be ejected. The ejection tabs 120 are shown as extending outwardly from the outer surface of the continuous upstanding wall 100 but other devices or features that allow for ejection are contemplated. Further, it is contemplated that the housing 86 is formed from two or more parts that would separate to allow baked bread to be more easily removed from the pan 80. A housing 86 with the ability to separate would also allow more complex shapes of bread to be baked without concern of removing baked bread from the pan 80. The housing 86 may have a tapered portion adjacent the top edge 102 to allow positioning error without mechanical interference when the top cap 92 is inserted. The distance between the top edge and the bottom wall is greater than the distance between the terminal end surface 98 and the planar portion 96. When inserted into the housing 86, the terminal end surface 98 is below the top edge 102.

The top cap 92 has a planar portion 122 and the wing plate 94, as in FIG. 17, is attached to and extends from one side of the planar portion 122. The wing plate 94 has an outwardly facing surface 124, as in FIGS. 19 and 21, that is complimentary to the terminal end surface 98 of the male mold portion 84. As assembled into the complete pan 80, the terminal end surface 98 is spaced from the outwardly facing surface 124. The complimentary nature of these surfaces allows for flexibility of the shape of the bun while still retaining more uniform wall thickness in a baked bun. This is visible in FIGS. 19, 21. The wing plate 94 is spaced from the planar portion 122 with spacing walls 130, 132, see FIG. 19. The spacing walls 130, 132 are optional and only serve to space the wing plate 94 from the planar portion 122. The wing plate 94 has a middle section 134, a side section 136 and a second side section 138. The side sections 136, 138 are obliquely angled with respect to the middle section. These sections form the outwardly facing surface 124, in FIG. 19. The wing plate 94 further includes a perimeter edge 140. The perimeter edge 140 is sized and shaped to be in close proximity or contact with the inside surface 106 of the continuous perimeter wall 100 when the wing plate 94 is inserted into the housing 86. It is contemplated that the wing plate 94 is flat, curved, or other shape. As shown in FIG. 21, the wing plate 94 as shown in FIGS. 17 and 19, and outwardly facing surface 124 may be formed similarly to the base plate and have a continuous surface.

Figure 20:
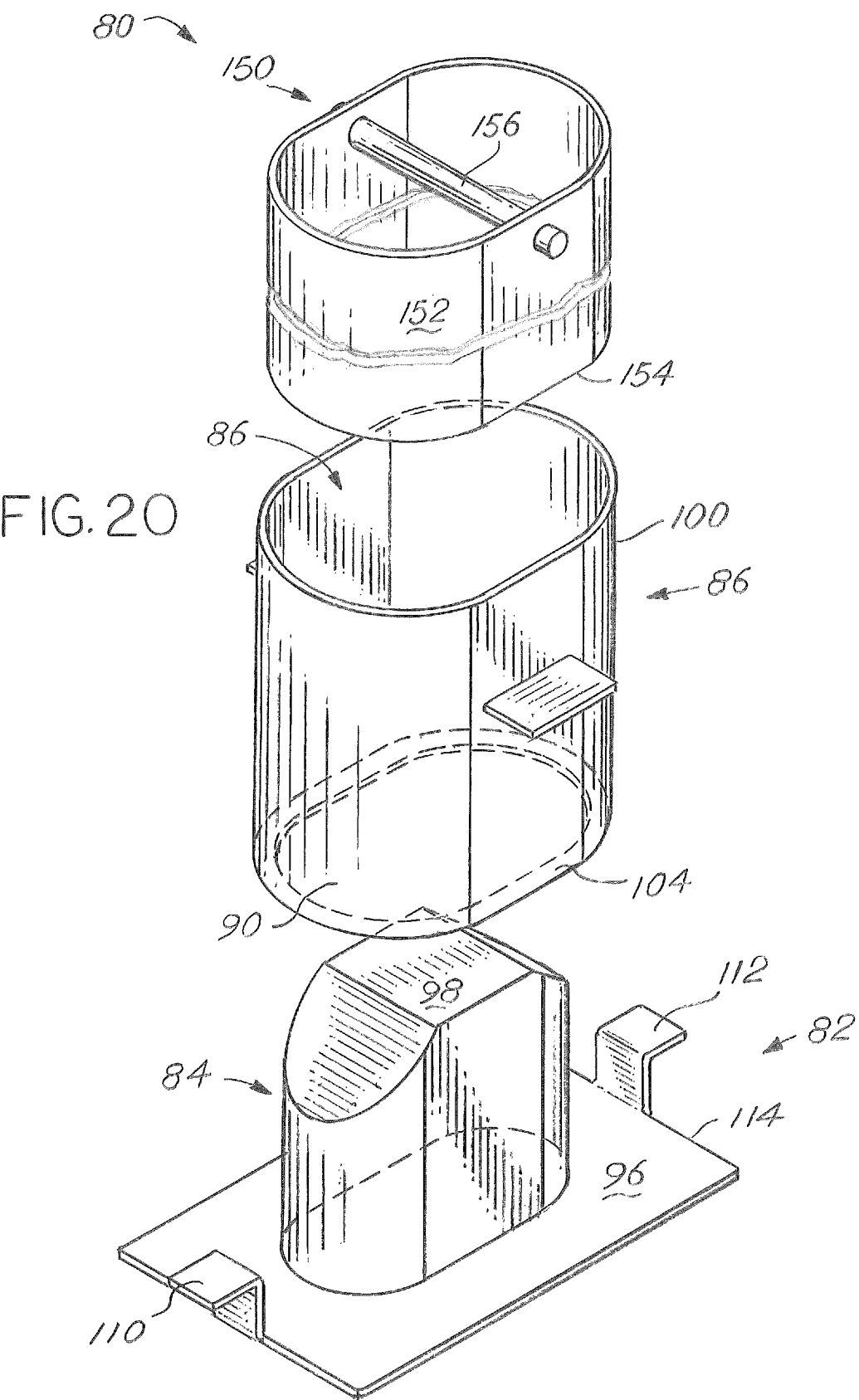
FIG. 20 is an perspective view of the pan with an optional stuffer.

Because some dough is more viscous than other dough, a stuffing ram 150, as in FIG. 20, may be required. The stuffing ram 150 has a continuous wall 152 with a leading edge 154. The ram 150 is open to allow air to move through the ram 150 as it is being inserted or withdrawn from the pan 80. As shown in FIG. 21, the leading edge 154 presses through the dough, driving it downwardly. The continuous wall 152 is shaped to temporarily reside between the male mold portion 84 and the continuous upstanding wall 100. The stuffing ram 150 is used to drive dough 78 down into the area of the pan 80 that is nearest the bottom wall 104. It is contemplated that pressure or vacuum will assist or be used to move the dough to fill the mold. It is further contemplated that vent holes (not shown) in the male mold near the planar portion 96 allow air to escape while the dough is being pressed downwardly. The ram 150 includes a gripping feature 156 that is attached to opposing sides of the continuous wall 152. The gripping feature is used to allow automation equipment to insert and remove the ram 150. As described, the ram 150 is used only to insert the dough and is not present for the baking process. It is contemplated that the gripping feature 156 utilizes different features that would be used by automation equipment, such as tabs, through-holes, or gripping areas.

To make baked bread with the pan 80, the user starts with a clean housing 86 and inserts the base plate 82 into the aperture 90. Dough 78 is then dispensed above the open top 88, where it drops onto the male mold portion, typically the terminal end surface 98. The dough 78 may fill in the voids near the bottom wall 104, based on the size of the mold and viscosity of the dough 78. At that point, the optional stuffing ram 150 is inserted, driving the dough 78 downwardly. This step is shown in FIG. 21. After the dough is placed into the pan 80 and driven sufficiently downward toward the bottom wall 104, the ram 150 is removed and the top cap 92 is installed, where the perimeter edge 140 is in close proximity or touching the inside surface 106 of the continuous perimeter wall 100. The assembly of these parts creates a mostly closed cavity to form the dough where the dough will expand and fill as it bakes or can be used to only form the dough. Gaps between adjacent parts allow gases to escape.

To eject the baked bread, the top cap 92 and base plate 82 are removed from the housing 86. This allows the baked bread to be ejected from the housing. Once the parts are cleaned, the pan 80 is ready for another baking cycle. As is well known in the art, it is common to apply a non-stick coating or surface on any part that may contact a food product, particularly one that is baked.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A pan adapted for baking bread comprising:
a base plate having a planar portion and a male mold portion extending therefrom to form a continuous surface, said male mold portion terminating at a terminal end surface, said terminal end surface spaced from said planar portion by a first distance, said male mold portion having draft that narrows said male mold portion with increasing distance from said base plate, said male mold portion having a perimeter defined by the intersection of said male mold and said planar portion;
a housing having a continuous upstanding perimeter wall intersecting a bottom wall affixed thereto, said upstanding perimeter wall having an interior surface and an exterior surface, said upstanding perimeter wall having a top edge opposite said bottom wall, said top edge spaced from said bottom wall by a second distance, said bottom wall having an upper surface, a lower surface, and an aperture extending between said upper and lower surface adapted for receiving said male mold portion, said aperture having a complimentary shape to said perimeter of said male mold, said aperture adapted for receiving said male mold portion;

a removable top cap having a top planar portion and a wing plate, said wing plate extending from said top planar portion, said wing plate having an outwardly facing surface with a profile being complimentary to and spaced from said terminal end surface of said male mold portion when a portion of said top planar portion is contacting said top edge of said housing and said wing plate extends into said housing toward said male mold portion;

said base plate, said housing, and said top cap forming a substantially enclosed volume when said housing receives said base plate and said top cap; and a dough stuffing ram having a continuous perimeter wall adapted to be located between said male mold portion and said housing.

2. The pan of claim 1, wherein a portion of said outwardly facing surface being obliquely angled with respect to said top planar portion, said outwardly facing surface terminating at a perimeter edge adapted for complimentarily contacting said interior surface of said upstanding perimeter wall.

3. The pan of claim 1, said base plate having an ejection wing affixed to said planar portion, said ejection wing having a perpendicular portion extending substantially perpendicular from said planar portion to an overhanging portion, said overhanging portion being substantially parallel to said base plate.

4. The pan of claim 1, said housing having an ejection tab extending outwardly from said perimeter wall.

5. The pan of claim 1, said outwardly facing surface of said top cap extending outwardly from said planar portion of said top cap to form a continuous surface.

6. The pan of claim 1, said continuous perimeter wall of said dough stuffing ram having a length greater than said first distance of said base plate.

* * * * *